US009681486B2

(12) United States Patent
Lundström et al.

(10) Patent No.: US 9,681,486 B2
(45) Date of Patent: Jun. 13, 2017

(54) METHODS AND DEVICES FOR MANAGING A CELLULAR RADIO NETWORK

(71) Applicant: Telefonaktiebolaget L M Ericsson (publ), Stockholm (SE)

(72) Inventors: Anders Lundström, Sollentuna (SE); Elisa Bellagamba, Stockholm (SE); Lars Frid, Danderyd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/891,107

(22) PCT Filed: May 17, 2013

(86) PCT No.: PCT/SE2013/050563
§ 371 (c)(1),
(2) Date: Nov. 13, 2015

(87) PCT Pub. No.: WO2014/185844
PCT Pub. Date: Nov. 20, 2014

(65) Prior Publication Data
US 2016/0100452 A1 Apr. 7, 2016

(51) Int. Cl.
*H04W 4/00* (2009.01)
*H04W 76/04* (2009.01)
(Continued)

(52) U.S. Cl.
CPC ......... *H04W 76/04* (2013.01); *H04J 11/0093* (2013.01); *H04L 43/0811* (2013.01);
(Continued)

(58) Field of Classification Search
CPC ... H04W 24/02; H04W 76/04; H04W 76/021; H04W 16/00; H04W 24/04; H04W 76/02; H04W 76/023; H04W 76/028
See application file for complete search history.

(56) References Cited

U.S. PATENT DOCUMENTS

| 2009/0264130 A1 | 10/2009 | Catovic et al. | |
| 2011/0044264 A1* | 2/2011 | Chen | H04W 36/245 370/329 |
| 2012/0258719 A1* | 10/2012 | Fujito | H04W 88/08 455/438 |

FOREIGN PATENT DOCUMENTS

| EP | 2 482 607 A1 | 8/2012 |
| WO | WO 2011/150250 A1 | 12/2011 |

OTHER PUBLICATIONS

Notification of Transmittal of the International Search Report and the Written Opinion of the International Searching Authority, or the Declaration for International application No. PCT/SE2013/050563, Mar. 13, 2014.

(Continued)

*Primary Examiner* — Khalid Shaheed
(74) *Attorney, Agent, or Firm* — Baker Botts, LLP

(57) ABSTRACT

In a radio system a network node is provided to be operatively connected to a set of radio base stations of the radio network and to retrieving a neighbor list from each radio base station in said set of radio base stations. Based on said list of neighbors it is determined if a pair of radio base stations lack a connection between them, and upon determining that a connection between two radio base stations is lacking a connection between said pair of radio base stations is set up.

6 Claims, 5 Drawing Sheets

(51) Int. Cl.
*H04W 24/02* (2009.01)
*H04L 12/26* (2006.01)
*H04J 11/00* (2006.01)
*H04W 76/02* (2009.01)
*H04W 76/06* (2009.01)
*H04W 88/08* (2009.01)
*H04W 88/12* (2009.01)

(52) U.S. Cl.
CPC ......... *H04W 24/02* (2013.01); *H04W 76/025* (2013.01); *H04W 76/068* (2013.01); *H04W 88/08* (2013.01); *H04W 88/12* (2013.01)

(56) References Cited

OTHER PUBLICATIONS

Evaluations of LTE Automatic Neighbor Relations by Anders Dahlen; Arne Johansson; Fredrik Gunnarsson; Johan Moe; Thomas Rimhagen; Harald Kallin; Vehicular Technology Conference (VTC Spring), May 15, 2011 IEEE 73rd.
3GPP TSG-SA5 (Telecom Management); Meeting SA5#60bis; Budapest, Hungary; Source: Ericsson; Title: The NoX2 attribute and the management of X2 links (S5-081372), Sep. 10-12, 2008.

* cited by examiner

METHODS AND DEVICES FOR MANAGING A CELLULAR RADIO NETWORK

PRIORITY

This nonprovisional application is a U.S. National Stage Filing under 35 U.S.C. §371 of International Patent Application Serial No. PCT/SE2013/050563, filed May 17, 2013, and entitled "Methods And Devices For Managing A Cellular Radio Network."

TECHNICAL FIELD

The present disclosure relates to methods and devices for managing a cellular radio network.

BACKGROUND

The evolved UMTS Terrestrial Radio Access Network (UTRAN) which provides the radio interface in the third generation Partnership Program (3GPP) Long Term Evolution (LTE) architecture consists of radio base stations eNB, providing the evolved UTRAN User Plane (U-plane) and Control Plane (C-plane) protocol terminations towards a User Equipment (UE). The eNBs are interconnected with each other by means of the X2 interfaces. It is assumed that there always exist an X2 interface between the eNBs that need to communicate with each other, e.g., for support of handover of UEs in LTE_ACTIVE mode. This is further defined in 3GPP release 12.

FIG. 1 generally depicts a configuration in an LTE network architecture. FIG. 1 shows the X2 interfaces 16 between the eNBs and also the S1 interfaces 17 between the eNBs and the Mobility Management Entity (MME) and Serving Gateway, (S-GW).

The X2 interface is used for control plane traffic and optional forwarding of user plane traffic during handover. There is also provision for an S1-based handover but is typically only employed as a fallback option when the X2 interface is not available. Current estimates indicate that the combined X2-c and X2-u traffic could be between 4 and 10 percent of the core-facing bandwidth over the S1-u interface and the delay should be less then 30 ms. This traffic is typically important and from future releases in LTE Advanced, it is envisaged that more user plane traffic will traverse the S1-u interface. Also in Release 11 there will be stringent latency requirements necessary to implement features such as collaborative Multiple Input Multiple Output (MIMO) and Coordinated Multi Point (CoMP).

The connectivity between eNBs can be provided by the means of Layer 3 (L3) connectivity services. For this purpose, the deployment of Internet Protocol/MultiProtocol Label Switching (IP/MPLS) network elements connecting eNBs is required. In the alternative, the L3 connectivity end point can be implemented at or close to the S-GW site, but this can be associated with some drawbacks: First it may introduce too high communication latency and loading the typically bandwidth-limited backhaul link with inter-eNB traffic. Second implementing L3 end points directly on the backhaul network connecting eNBs, may introduce a too high configuration/provisioning complexity as the operator will have a much higher number of configuration points compared to the centralized solution.

In both cases a rather static configuration of the L3 end points will typically be the most viable option in order to avoid an even higher configuration complexity, which in turn can cause sub-optimal resource utilization and some pairs of eNBs not directly connected.

Hence, there is a need for a method and an apparatus that provide an improved utilization of resources in a cellular radio network, in particular an LTE radio network.

SUMMARY

It is an object of the present invention to provide an improved method and apparatus for improving utilization of resources in a cellular radio network, in particular an LTE radio network.

This object and others are obtained by the method and device as set out in the appended claims.

In accordance with some embodiments a network node is provided to be operatively connected to a set of radio base stations of the radio network and to retrieving a neighbor list from each radio base station is said set of radio base stations. Based on said list of neighbors it is determined if a pair of radio base stations lack a connection between them, and upon determining that a connection between two radio base stations is lacking a connection between said pair of radio base stations is set up.

In accordance with some embodiments it is further determined from the neighbor list is there is an existing connection between two radio base stations that is not used, and upon determination that a connection between two radio base stations is unused the connection between that pair of radio base stations can be released. In one embodiment the connection is only released if a timer associated with said pair of radio base stations has expired. The timer can be set when no timer exists for said pair of radio base stations and it is determined that there is an existing connection between two radio base stations that is not used.

The radio network can typically be a Long term evolution, LTE, network where the connection between the radio base stations is provided over the X2 interface of the LTE radio network. However, the radio network can be of other types. For example the radio network can be a heterogeneous network or a radio network comprising small cells.

In accordance with embodiments described herein a central node is provided. The central node can be implemented as an external standalone server or embedded with an MME element. The central node is configured to dynamically compute a list of eNBs which needs to be connected in the current and an upcoming timeframe while handling the distributed L3 connectivity setup of the network elements backhauling the eNBs connections. Using the central node as described herein this can be performed in one unit.

Thus a single L3 configuration location is provided in one node instead of in multiple locations in the mobile backhaul network. Hereby an automatic and dynamic detection of connectivity needs depending on traffic patterns can be provided. Also a meshed L3 connectivity services without the need to deploy L3 Network elements in Mobile Backhaul is enabled. The provision of a central node for managing eNB connections also makes it possible to continuously use a shortest path connection between eNBs, saving backhaul capacity and minimizing delay.

The disclosure also extends to a node for use in a cellular radio system adapted to perform the methods as described herein. The node can be provided with a controller/controller circuitry for performing the above processes. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawings, in which.

DETAILED DESCRIPTION

Figure 1:
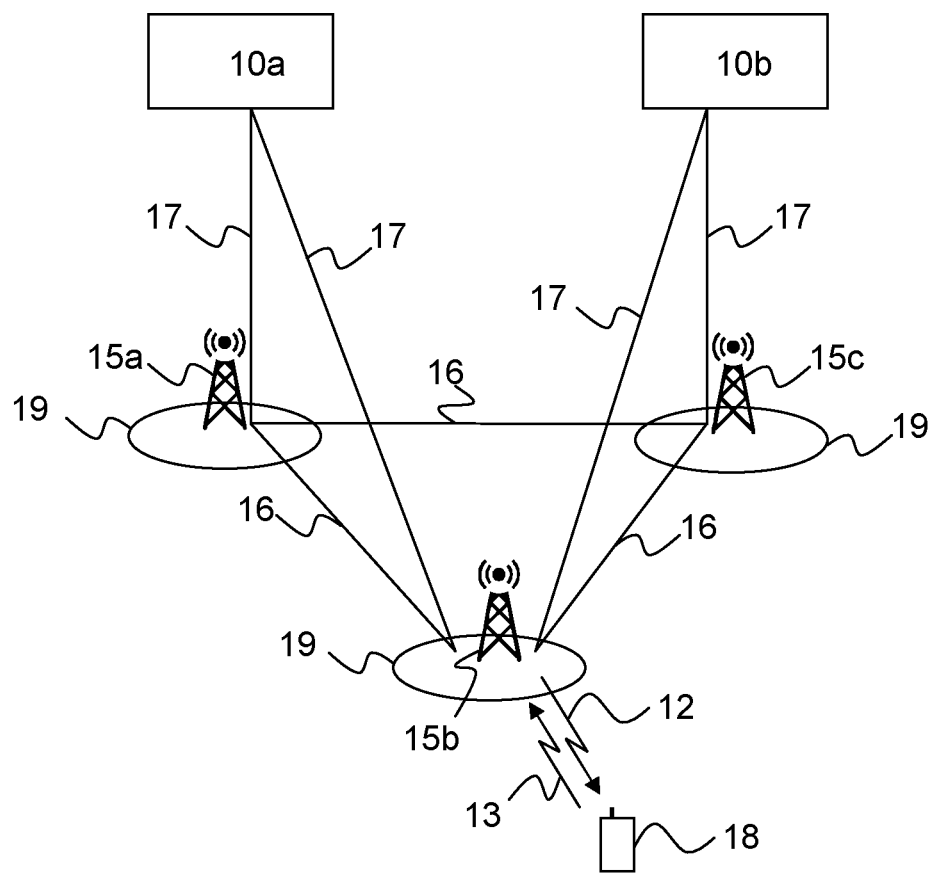
FIG. 1 is a general view of a cellular radio network.

In FIG. 1 a general view of a cellular radio system is depicted. The system can for example be an LTE radio system. The system comprises a number of radio base stations 15a, 15b, 15c, termed eNBs. A mobile station 18, termed User Equipment UE, that is in a geographical area 19 covered by an eNB can connect to the eNB over an air-interface providing a downlink 12 and uplink 13. The eNBs can be connected to each other via an X2 interface 16. Also each eNB is connected to an S-GW/MME 10a, 10b via an S1 interface 17.

In a network such as the network schematically illustrated in FIG. 1, the X2 topology can be established either through configuration from e.g. a management system, or in combination with learning from performed handovers as UEs move in the network. The network will then over time learn which eNB neighbor relations that are applicable.

To enhance performance in a cellular network such as the network depicted in FIG. 1, a central node for managing X2 connections can be provided. The central node can be configured to perform the following actions:

Fetch lists of neighbor eNBs associated to each eNBs.
Check if a connection between the listed neighbors is already available.
If a connection is not available, set up a connection using an OpenFlow configuration protocol.

Figure 2:
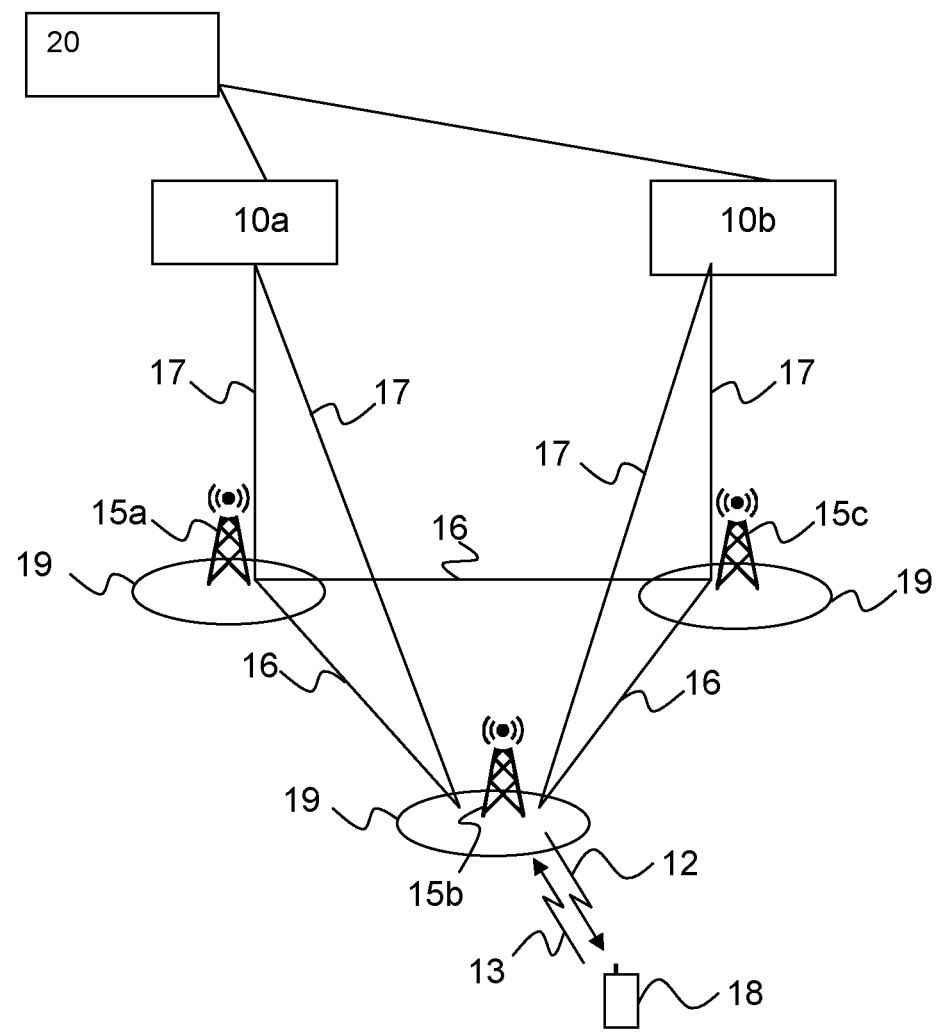
FIG. 2 is a general view of a cellular radio network comprising a central node for managing connections between radio base stations in the radio network.

In FIG. 2 such a central node 20 is depicted in a network as set out in FIG. 1. The central node can be configured as a stand alone device or it can be embedded/co-located with another node such as an MME device in the LTE network.

Figure 3:
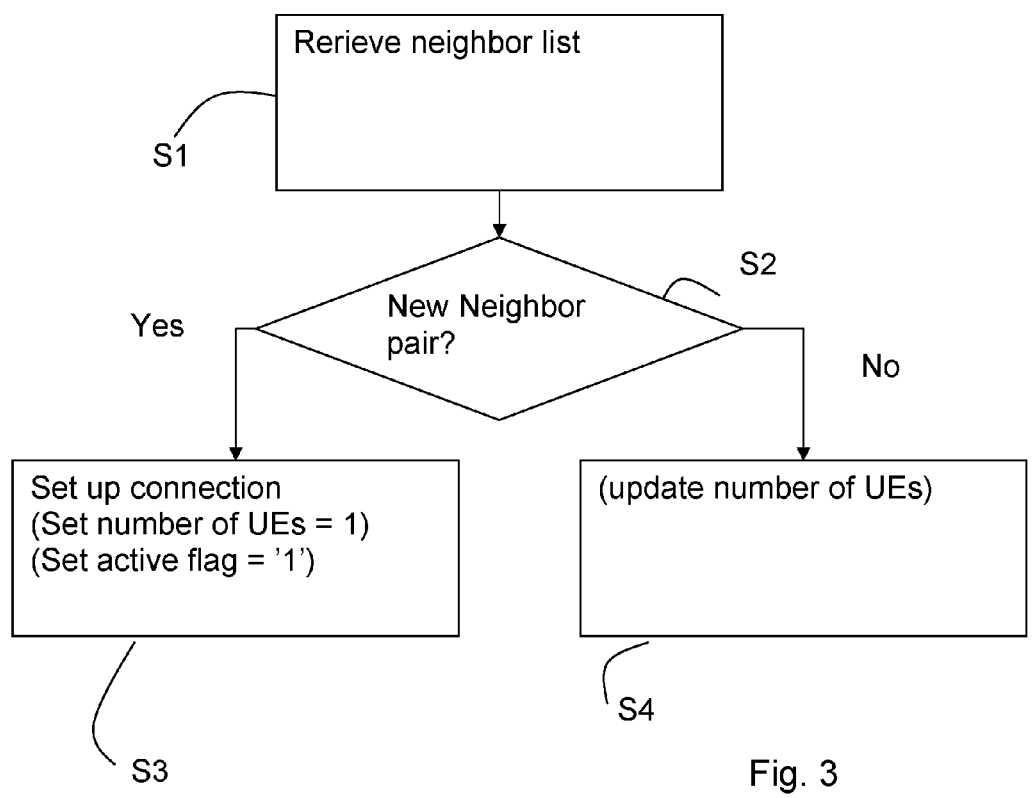
FIG. 3 is a flowchart illustrating some steps performed when setting up a connection between two radio base stations.

In FIG. 3 a flow chart illustrating some steps that can be performed in a central node are depicted. First in a step S1, the central node fetches a list of neighbors eNBs associated to an eNB from the respective eNBs. The lists are fetched in accordance with some scheme. For example the lists can be fetched at some suitable time intervals. The time interval can be configurable, that can be set by an operator. In some instances the time interval can range from a second to 30 minutes.

Next in a step S2 the received list is checked to see if there is there is a need for a new connection between two eNBs. If the check in step S2 reveals that there is a need for a new connection between two eNBs a flag can in accordance with some embodiments be set to indicate this by setting the flag to '1' and the number of UEs is set to one '1'. Also a new connection is set up between the two eNBs where a connection is determined to be needed in step S2. This set up is performed in a step S3. The set up in step S3 can be performed using the OpenFlow protocol such that the SDN controller will be triggered to configure the new path with OpenFlow. If, on the other hand there is no new neighbor pair in the list retrieved in step S1 as determined in step S2, the number of UEs is updated. By keeping a record on the number of UEs it is possible to determine when there are no more UEs that require a particular connection between two eNBs. Thus by keeping a record over the UEs it is possible to delete a connection between two eNBs when the connection is no longer needed.

Figure 4:
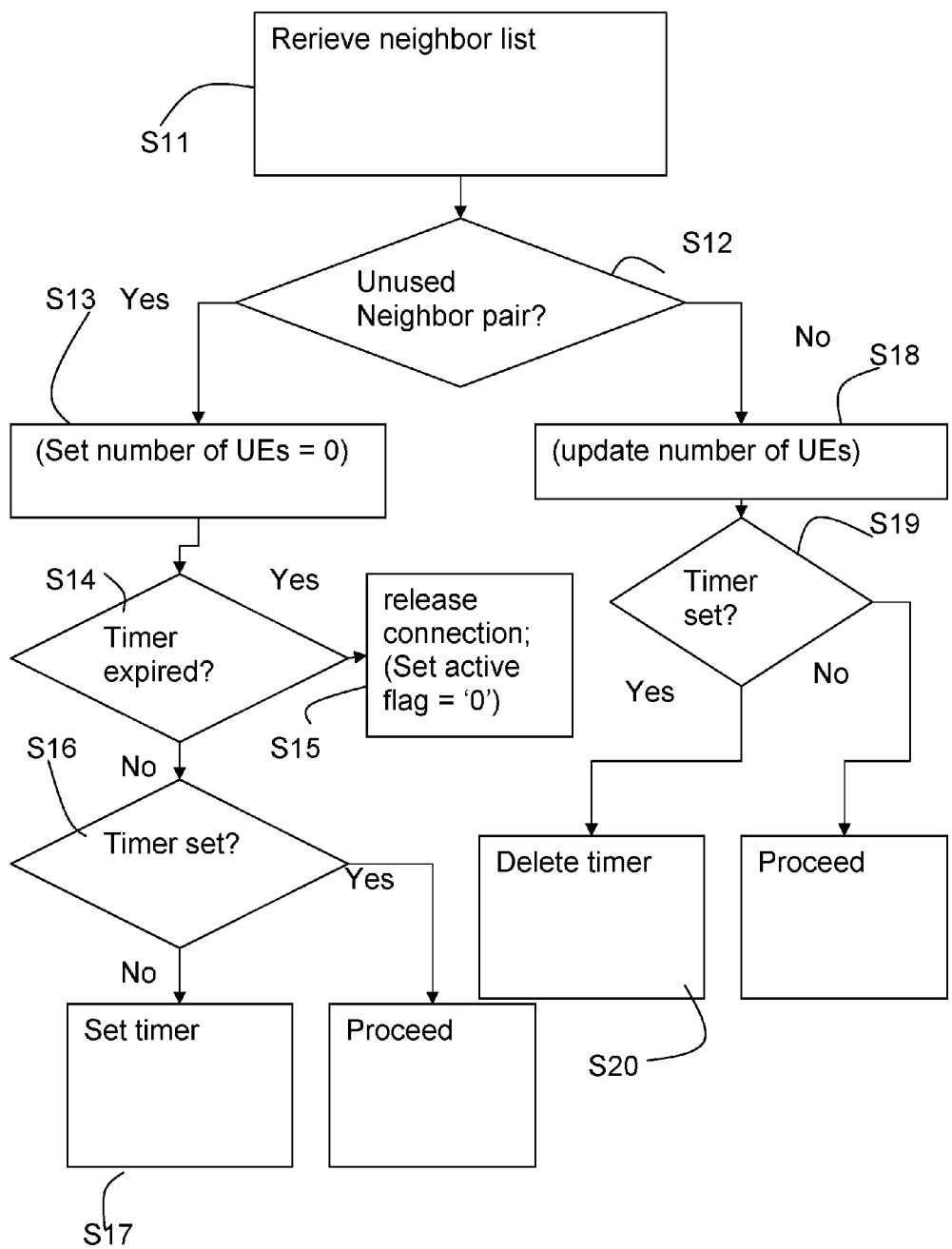
FIG. 4 is a flowchart illustrating some steps performed when disconnecting a connection between two radio base stations.

In FIG. 4 another flowchart illustrating some steps performed in that can be performed in a central node are depicted. The timer functionality in the below exemplary embodiment is optional. The timer can be useful to reduce the number of connection setups and releases. First, in a step S11, the central node fetches a list of neighbors eNBs associated to an eNB.

Next, in a step S12, the received list is checked to see if there is there is an unused connection between two eNBs. If the check in step S12 reveals that there is an unused connection between two eNBs the number of UEs is set to zero '0' in a step S13. Next in a step S14 it is checked if a timer has expired. The step S14 is optional. If the timer has expired in step S14 a flag can be set to indicate this by setting a corresponding flag to '0' and releasing the connection between the eNBs determined to be unused in step S12. The release of the connection and flag setting can be performed in a step S15.

If a timer is employed and the timer has not expired in step S14, it can be checked in a step S16 if the timer is set. If the timer is set the procedure continues, but otherwise the timer is set in a step S17.

If in step S12 it is reveals that a particular connection between two eNBs is not unused, the number of UEs is updated in a step S18. Also, as an optional procedure it can be checked if a timer is set in a step S19. If the timer is set the timer is deleted in a step S20 else the procedure proceeds.

The following table shows an example of a data structure maintained by a central node to keep track of the status and the utilization of the connections and referred to in FIG. 3 and FIG. 4. The table already includes the complete set of entry for a full mesh topology. The "active" flag determines which connection is currently setup, while the "number of UE" reports how many UEs have such connection currently in their list or in alternative what is the status of the utilization of the channel.

The frequency with which the controller fetches the neighbor list from eNBs determines the grade of dynamicity by which the connections can be updated. Tradeoffs considerations between the amount of info to be processed by the controller and the required system reactivity can be done.

In accordance with some embodiments the lists are fetched more frequently from some parts of the network than from other parts of the network. For example the lists can be fetched more frequently from the part of the network determined to be more dynamic and fetching is performed more seldom from a part of the network determined to be more stable. Also the check if a connection between two eNBs is unused can be performed with lower frequency than a check if a new connection between two eNBs is required. Check only periodically if the existing connections are still needed by fetching the lists from eNBs.

TABLE 1

| From | To | Num. of UEs/utilization | Active | Timer |
|------|----|-----------------------|--------|-------|
| 1 | 2 | 3 | 1 | N/A |
| 1 | 3 | 5 | 1 | N/A |
| 1 | 4 | 0 | 1 | 10 |
| 2 | 3 | 0 | 0 | 0 |
| 2 | 4 | 7 | 1 | N/A |
| 3 | 4 | 10 | 1 | N/A |

A corresponding mechanism can be used for optimizing resources in small cells/HetNets (heterogeneous networks). The method as described above can thus also be applied for heterogeneous networks and for small cells.

Figure 5:
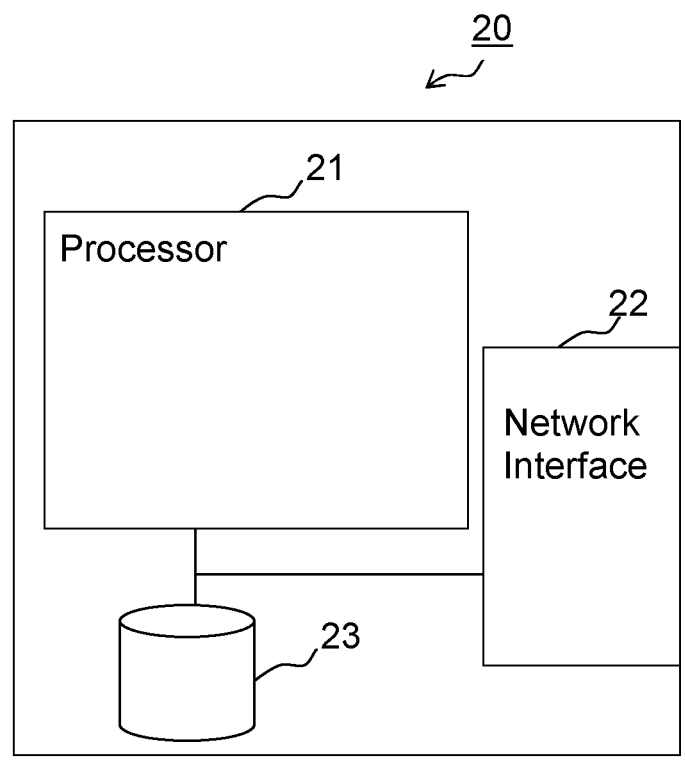
FIG. 5 illustrates a central node for managing connections between radio base stations in the radio network.

In FIG. 5 a device for implementing the central node 20 is depicted. As set out above the central node 20 can be implemented as a stand alone server or it can be embedded in an existing node such as an MME. The central node comprises a processor 21, a memory 23, and a network interface 22 for connection to other nodes of the network that the central node is in communication with such as the eNBs. In particular embodiments, some or all of the functionality described above as being provided by a central node, is provided by the processor 21 executing instructions stored on a computer-readable medium, such as the memory 23. The hardware of the central node 20 can comprise one or many processors 21 that can be arranged to execute software stored in a readable storage media such as the memory 23. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

The invention claimed is:

1. A method in a node of a radio network, the node being operatively connected to a set of radio base stations of the radio network, the meth comprising:
   retrieving a neighbor list from each radio base station in the set of radio base station determining based on the list of neighbors:
      if one or more pairs of radio base stations lack a connection between them
      and
      if one or more pairs of radio base stations have an unused existing connection between them;
   setting up a new connection between a pair of radio base stations from the set of radio base stations upon determining that the pair of radio base stations lack a connection between them; and
   releasing an existing connection between a pair of radio base stations from the set radio base stations upon determining that the pair of radio base stations have an unused existing connection between them, wherein;
      the new connection is only released if a timer associated with the pair radio base stations has expired, and
      the timer is set when no timer is employed for the pair of radio base stations and it is determined that there is an existing connection between two radio base stations that is not used.

2. The method according to claim 1, wherein:
   the radio network is a Long term evolution, LTE, network; and
   a connection between a pair of radio base stations is provided over the X2 interface of the LTE radio network.

3. The method according to claim 1, wherein the radio network is at least one of a heterogeneous network or a radio network comprising small cells.

4. A node for a radio network, the node being operatively connectable to a set of radio base stations of the radio network; the node comprising:
   controller circuitry adapted to:
   retrieve a neighbor list from each radio base station in the set of radio base stations;
   determine based on the list of neighbors:
   if one or more pairs of radio base stations lack a connection between them, and
   if one or more pairs of radio base stations have an unused existing connection between them;
   set up a new connection between a pair of radio base stations from the set of radio base stations upon determining that the pair of radio base stations lack a connection between them;
   release an existing connection between a pair or radio base stations from the set or radio base stations upon determining that the pair of radio base stations have an unused existing connection between them, wherein:
      the new connection is only released if a timer associated with the pair of radio base stations has expired, and
      the timer is set when no timer is employed for the pair of radio base stations and it is determined that there is an existing connection between two radio base stations that is not used.

5. The node according claim 4, wherein:
   the radio network is a Long term evolution, LTE, network; and
   a connection between a pair of radio base stations is provided over the X2 interface of the LTE radio network.

6. The node according to claim 4, wherein the radio network is at least one of a heterogeneous network or a radio network comprising small cells.

* * * * *